Jan. 25, 1966   A. L. TOWLES   3,231,064
ARTICULATED CASCADE CONVEYOR
Filed Dec. 21, 1962   3 Sheets-Sheet 2

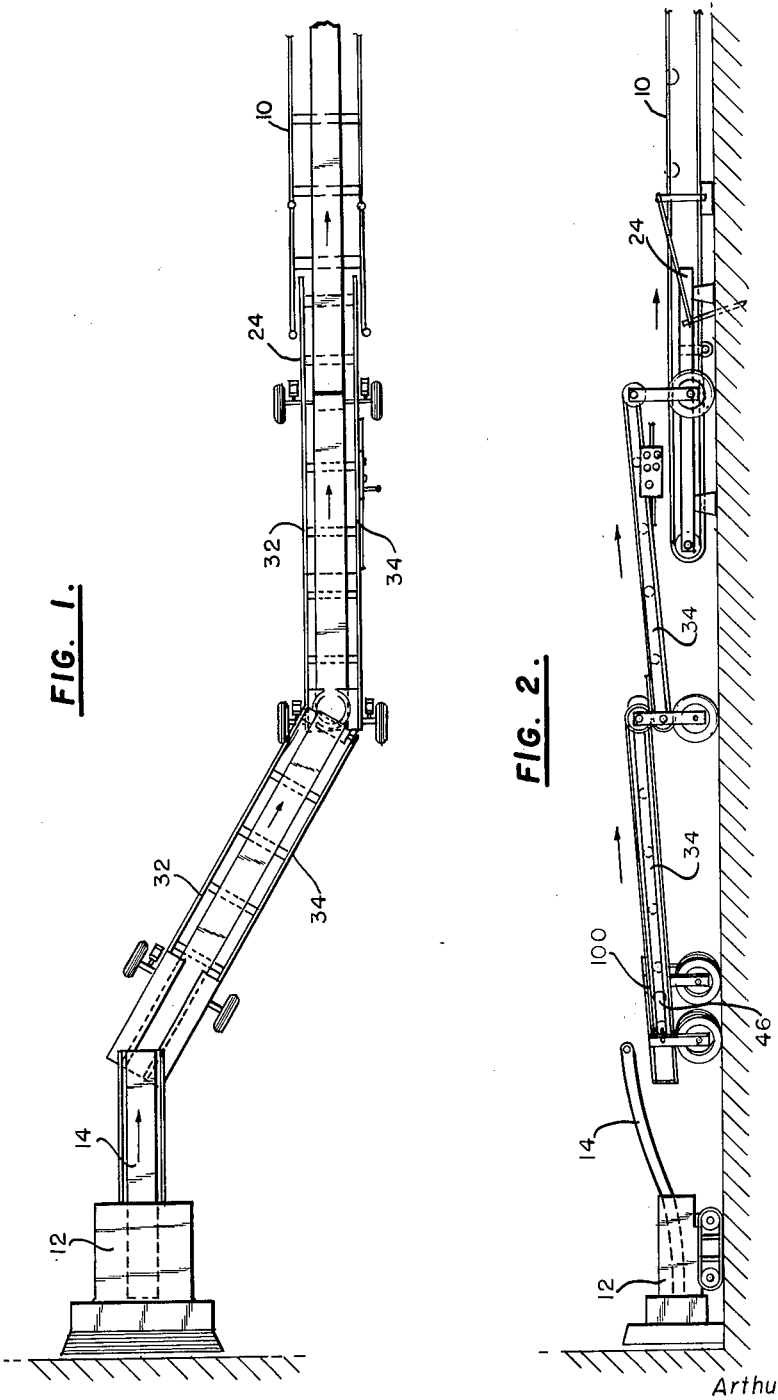

INVENTOR
Arthur L. Towles
BY John L. Shortley
ATTORNEY

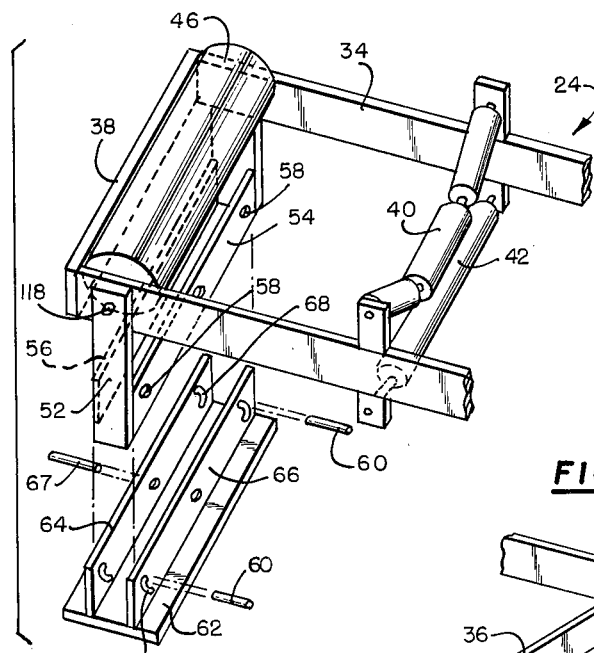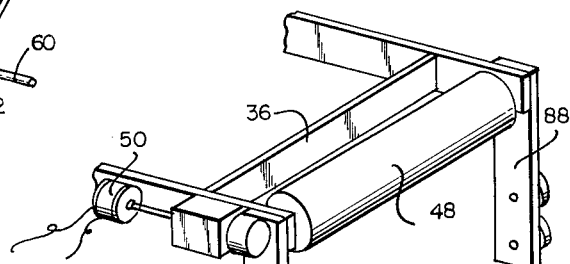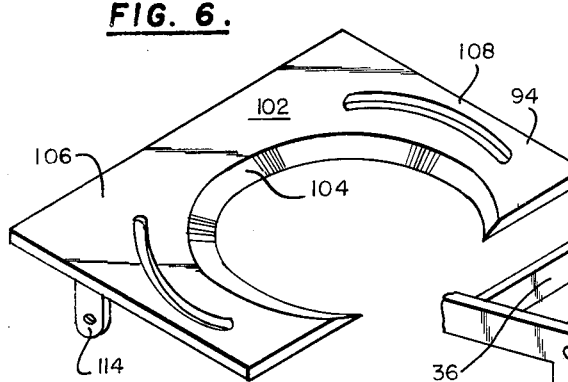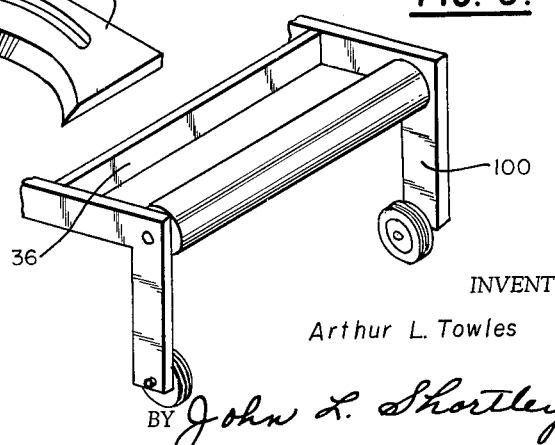

United States Patent Office 3,231,064
Patented Jan. 25, 1966

3,231,064
ARTICULATED CASCADE CONVEYOR
Arthur Leon Towles, 700 Hadfield St., Marion, Ill.
Filed Dec. 21, 1962, Ser. No. 246,383
4 Claims. (Cl. 198—92)

My invention relates to material gathering and conveying systems and in particular to a self-propelled cascade conveyor bridging device.

It is often necessary to transfer material in bulk form from a gathering, digging or elevating machine to a relatively fixed conveyor. Furthermore, since very often the gathering, digging or elevating machine must move relative the conveyor or other material tranfer device, it is necessary to provide a flexible connection between these two elements. In many instances independently movable vehicles such as dump trucks or shuttle cars are employed as the link between the digging machines and the fixed conveyor. The trucks or cars are driven to the miner or similar machine, receive the material from it, and when filled are moved independently to the conveyor where they deposit the material. The material is either dumped directly onto the conveyor or into a conveyor feed device.

The limitations inherent in such systems have resulted in proposals for more satisfactory equipment or methods. There have thus been suggested certain flexible interconnections or "bridging" devices between the digging machine and the conveyor with the thought that a more continuous connection would provide more satisfactory operation of the digging machine, as well as the conveyor. The digging or gathering machine could then operate more continuously, and the loading of the conveyor could then be more uniform without the use of the special bins, hoppers and feeding devices. Obviously the need for flexible interconnecting systems increases as the relative movement between the gathering machines and the fixed conveyor installations increase. Further, variations in relative elevations, as well as horizontal movement will increase the need. It would be particularly desirable to have a flexible interconnection where movements are substantially continuous and where the rate of gathering is relatively high as compared to the capacity of shuttle cars and other similar transfer devices.

The problem heretofore experienced with relatively movable digging or gathering machines and relative fixed conveyors is enhanced where the gathering machine must make advances and withdrawals or retreats with respect to the conveyor and in the process of doing so also must make lateral or other angular extensions with respect to the general path of its movements inwardly and outwardly with respect to conveyor. A mining machine, for example, in certain operations in continuously moving for relatively short distances and then changing directions. The machine may go ahead 50 or 60 feet, and then withdraw along at least a part of the path it had taken and start out on another path. Further, such machines often operate in situations where there is little room to bring in equipment in multiple units. Thus, where shuttle cars are employed in a mine, for example, quite usually it is impossible to have more than one shuttle car closer to the miner than the next entry or passage way in the mine. The shuttle cars must go in to the meet the mining machine, become filled and then back out. The miner, therefore, must be shut down when one car is filled until another shuttle car can be brought into position and this cannot be accomplished until the filled car is driven out. According to my invention there is provided a system wherein there is a continuous, yet highly flexible connection between the miner and a relatively fixed conveyor, or a feed or storage means, so that the miner may operate continuously in any of its cutting, advancing, or retreating movements.

This invention will thus result in a material gathering system which will provide maximum utilization of equipment by making the process of gathering and conveying a continuous instead of an intermittent one.

Similar proposals have been made before; however, the heretofore proposed relatively flexible extension between the miner and conveyor have been complex and not flexible enough to provide means of easily adjusting the "bridging system" relative the miner and the relatively fixed conveyor. For example, in one instance it has heretofore been proposed to utilize a series of interconnected conveyor elements supported on wheels, yet the interconnection means between the units is not adjustable enough to provide satisfactory for the intended service. In other instances the equipment requires interconnections for providing "automatic" turning of the bridge supporting wheels. In some of these connections to the ground or other fixed structures are necessary. These provisions invariably result in increased complexity and do not permit the flexibility needed.

Accordingly, one object of my invention is to provide a bridging system which can be easily adjusted relative the conveyor and gathering machine so as to provide the real flexibility necessary for fully and continuously following the movements.

Still a further object of my invention is to provide a system comprising independent cascading conveyor units having self-propelling means which are independent of any fixed connections with the ground or units for or with which the cascade conveyor made by employed whereby true and complete mobility and flexibility is facilitated.

A further object of my invention is to provide a system comprising interconnected conveyor units of the cascading type which are adjustable laterally relative each other.

Yet another object is to provide a system comprising such units wherein each unit can be adjusted relative the other units while operating, as well as when they are shut down and not carrying material.

Still another object of the invention is to provide a cascading conveyor device or system comprising individual units pivotally interconnected wherein their connections have maximum rigidity and strength and excess loads are not placed upon the connecting elements due to pivoting or other relative movements or changes in the terrain.

Yet a further object of the invention is to provide a steerable device having a minimum number of wheels and yet with which maximum mobility is achieved.

Still another object of the invention is to provide a device in accordance with the preceding objects which is adapted to be moved in cascading relationship with a fixed or relatively fixed conveyor so that the cascading conveyors can transfer directly to the latter in the minimum amount of space and are adjustable with respect thereto.

Yet another object of the invention is to provide interconnection which will interconnect a series of cascade conveyors and provide the movements indicated above without being of excessive height or size or lateral dimensions so as not to unnecessarily restrict its use and to thus obtain wider use for the invention. This is particularly desirable to have minimum size for mining.

It is another object of the invention to provide a relatively simple supporting system and framing arrangement for a cascading conveyor bridging device facilitating manufacture, use and maintenance thereof.

These and other objects and advantages will become apparent from the following description and the accompanying drawings wherein:

FIGURE 1 is a top plan view diagrammatically illustrating a cascade type conveyor constructed in accordance with the invention in association with a fixed conveyor and a gathering machine.

FIGURE 2 is a diagrammatic side elevational view thereof.

FIGURE 5 is a fragmentary, enlarged, exploded perspective view of one end of a bridge conveyor.

FIGURE 6 is an enlarged fragmentary, perspective view of a means for interconnecting two bridges.

FIGURE 7 is an enlarged fragmentary perspective view of another end of a bridge conveyor, and FIGURE 8 is a fragmentary perspective view of another end of a conveyor.

Figure 3:
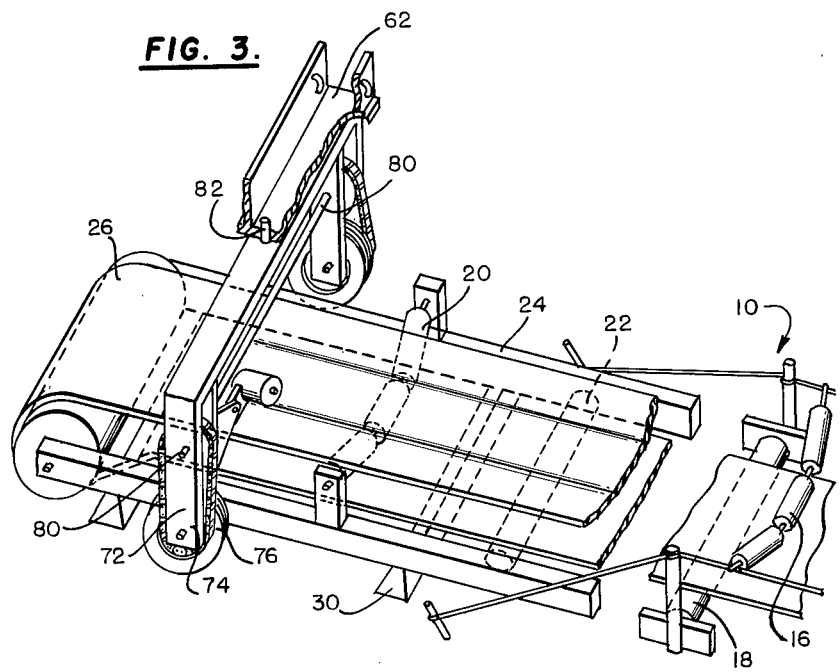
FIGURE 3 is an enlarged fragmentary perspective view showing a portion of a fixed conveying system, and a portion of the bridging means.

Referring now in particular to the drawings:

In FIGURES 1 and 2 I show my invention in association with a conveyor 10 and a mining machine 12. The mining machine may be of any known type and, as is customary, it has a self-contained conveyor device 14 for moving the coal from the face of the mining machine rearwardly to shuttle cars or other means for transporting the coal away from the cutting device. The conveyor system 10 is adapted to transport the coal, or other material, out of the mine or pit. This conveyor system may comprise, as illustrated, upper troughing idlers 16, lower return idlers 18 and suitable stands for supporting the conveyor. In this instance, a conveyor having rope side frames is illustrated. It will be understood that these elements are only diagrammatically illustrated because they are well known in the art. The conveyor system requires head and tail pulleys and it must be extended or withdrawn from time to time. A belt storage device, accordingly, may be employed with the system. But in any event, additional troughing idlers such as 20 and return idlers such as 22 must be, from time to time, inserted for extending the conveyor. I have shown that these idlers can be used in association with frame means 24 to form portable units which can be placed in position ahead of the rope conveyor. The head pulley 26 is connected to one of these frame sections. It is apparent, and known in the art, that a series of these members 24 and their connected idlers can be placed, one after another, at the end of the rope conveyor, as needed, so as to extend the rope conveyor for at least a limited distance. After a certain number of these extension units have been inserted it will be necessary to extend the rope conveyor itself. Then the sections 24 are removed and additional stands for supporting idlers 18 and the associated ropes are added to. It is more convenient, however, to extend for small distances by use of the frame 24 and their attached idlers. These frames, it should be noted, can be supported on pads 30. The whole system, thus provided, is an extensible conveying belt system adapted to advance or retreat into a mine or into another area or excavating site.

The problem, to which the instant invention is directed is that of moving the material from the continuously advancing mining or other excavating machine to this relatively fixed, although extensible, belt conveyor. The excavating device, as it chews into the sand, coal, or other material, quickly exhausts that immediately facing it and must progressively move into the material. Further, generally, a systemitized method of mining or excavating is employed which involves making certain "entries" into the face or surface of the material in a certain, regular, patterned fashion. Material between the entries is removed later.

It is desirable that one conveyor such as 10 be employed for removal of material within as wide an area as possible. This reduces the number of conveyors that must be installed, and generally reduces the cost of installation and overhead.

The mining machine is either constantly moving towards or away from the conveyor or otherwise shifting its position relative to it. As a result the problem of transporting material from the mining or other machine to the fixed conveyor is increased. Heretofore the main means of doing this has been by a cart or rail system. As stated above, in recent years shuttle cars, which are in reality self-propelled truck-like devices designed primarily for the particular usage, have been employed. The conveyor 14 on the mining machine has been used to fill the shuttle cars. When used in a system such as shown in the FIGURE 1 it is apparent that unless the openings cut by the miner or digger are wide enough, only one shuttle car at a time can go down such an opening, receive material, withdraw, and then transport it to the conveyor. Thus the mine operator is faced with the problem of either cutting very wide openings, if permitted by mining regulations, or simply slowing up the advancement of the mining machine. In any event, the mining machine is stopped while shuttle cars are being moved into, or out of proper position with respect to the mining machine and/or the fixed conveyor.

As indicated heretofore, it has long been realized that it would be desirable to have a continuous connection between the mining or similar machine and the conveying system; such that the mining or similar gathering machine might operate continuously and the amount of material removed be increased. By my invention I provide a practical, more satisfactory system and arrangement of elements for accomplishing this than heretofore suggested. I accomplish this by providing an extendable bridging system consisting of a series of articulated, cascading conveyors.

These conveyors form a mobile bridge system. This system comprises a number of individual conveyors or conveyor units 32. Each of these units consists of a side frame member 34 and end frame members 36 and 38 (see FIGURES 4, 5, and 8) which together form the basic conveyor frame. Upper troughing idlers 40 and lower return idlers 42 are supported on the frame and a belt 44 is carried by these idlers. Actually the conveyor frame is strengthened by the idlers.

This frame is provided with tail and head pulleys 46 and 48. These are journaled on the frame in spaced relation to the framed members so as to permit free action of the belt. The conveyor is adapted to be driven by the drive means 50 (see FIGURE 7). At its tail end each conveyor is provided with a depending frame comprising a vertical member 52 and a pair of parallel, longitudinal cross members 54 and 56 (see FIGURES 4 and 5). These latter two members are provided with aligned openings 58. Each pair of these is adapted to receive a pin 60. Beneath these members 54 and 56 there is a platform 62 provided with a pair of upstanding side plates 64 and 66. These plates are spaced to receive the two plates 54 and 56 on the depending frame attached to the conveyor, and the latter members extend laterally between the two plates 64 and 66. The pins 60 which are supported in the holes 58 are received in aligned slots 68 and 70 in the two plates 64 and 66. Another pin 67 can be provided centrally of the four plate members to provide a pivot point. It is apparent that the plates 54, 56 can adjust relative the plates 64 and 66 about a horizontal axis extending through the central pin 67. Thus the upper frame of the conveyor can adjust relative the lower frame elements positioned beneath the platform 62.

A wheeled support frame 72 (see FIGURES 3 and 4) is secured to platform 62. The wheeled support frame comprises depending legs 74 on which are rotatably supported wheels 76. The latter are preferably rubber tired and are adapted to engage the ground. A powered driving means 78, which includes a motor and suitable gearing and control circuitry therefore is provided for the purpose of driving the wheeled frame and its attached conveyor frame along the surface of the mine or other digging. In the form illustrated the motor is connected to a shaft 80 so that drive can be applied to both wheels. In this instance the platform 62 is pivotally connected to the frame 72 by a bolster pin 82 and a double-acting hydraulic steering jack 84 interconnects the frame 72 to the frame of unit 32.

Figure 4:
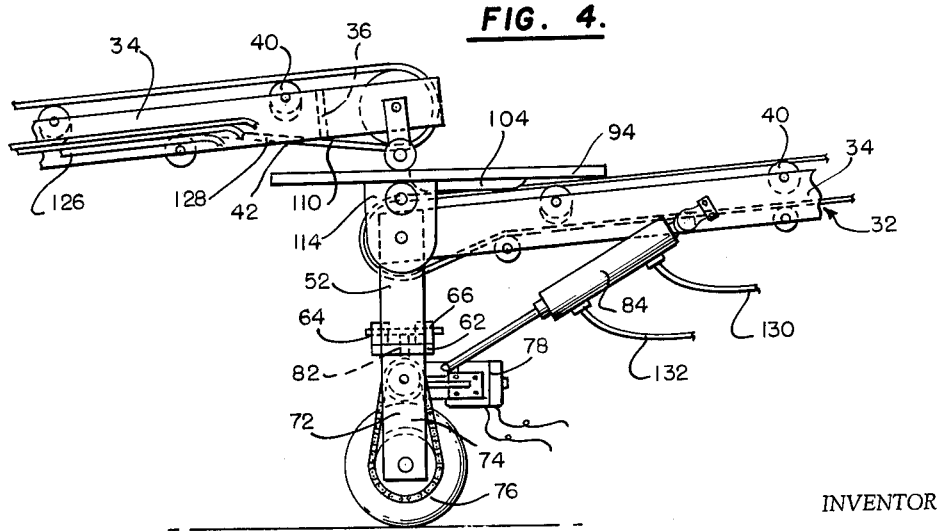
FIGURE 4 is a fragmentary side elevational view of two cascade conveyor bridging units on an enlarged scale.

All of the individual conveyor units, except the head end unit, have the following structure at their opposite head ends (see FIGURES 4 and 7). Each is provided with a pair of depending legs 86 and 88. At the lower ends each leg has opposed sets of rollers 90 and 92. These provide upper and lower pairs of rollers. This structure cooperates with a connecting device 94 (FIGURE 6). The latter provides the means for interconnecting the adjacent conveyors in cascading relationship. It is again pointed out that this will only apply for locations such as 96, 98. At the end 100 a different structure will be used. Each of the connecting devices 94 is formed by a plate 102. This has a central arcuate chute 104. A pair of slots 106 and 108 are concentrically disposed with respect to the central chute 104 and each of the legs 86, 88 extends through one of these slots. It will be apparent that the legs may alternately move through their respective slots for pivotal adjustment of one conveyor relative the other. The roller sets, it should be noticed, are positioned so that the load is supported and over-turning of the conveyors is prevented. The plate 102 is provided with a pair of depending ears 114, 116. These have a pair of openings adapted to provide for pivotal support of the ears upon the extended ends of the shaft 118. It will thus be apparent that the two conveyors can pivot about a horizontal axis extending transversely of the conveyors and can also pivot about a vertical axis extending through the conveyors, as well as about a third, horizontal, axis parallel to the conveyors. The third axis is provided by the central pin 67.

It will be understood that there may be two or more independent conveyor devices interconnected by the pivot means shown in FIGURES 3, 4, 5, 6, and 7, at their common ends, and also that at the inby and outby ends of the train of interconnected cascading, trailer-type articulating conveyors the structure is different only in that the pivotal connecting means between two conveyors is absent. Thus, at the location 100, in FIGURE 2, it is only necessary to support the inby end of the conveyor on wheels and likewise this is true of the outby end of the bridge.

It will be understood by those skilled in the art that the various motors have suitable controllers for effecting their proper operation; preferably the controllers for each will be located at a single point along any given series of individual conveyors used to form a bridge. This will facilitate control of all conveyors from a single point. Obviously, for this purpose, it is only necessary to run electrical conduits or hydraulic conduits along the sides of the conveyor frames and to provide hose connection for the hydraulic circuits at the points of pivot. These elements obviously need not be described in detail, but they consist of conduits and cables such as 126, 128, 130, 132, 134, 136, 138 and 140 and a control center 142. The latter has valves manually controlled by handles such as 144 and push buttons such as 146 for controlling the electrical circuits. Power is supplied by cable 148 and hydraulic pump 150.

The bridging system can be adjusted with respect to the conveyor 10 while material is being continuously transferred from the mining machine. Further, the individual bridges can be adjusted by movement of one with respect to the other about the pins 82. Thus the bridge can move in and out with respect to the conveyor 10 and no matter which way the miner or other machine moves the "bridge" can be maintained between it and the conveyor.

The ability of each unit to adjust about pins 82 and 67 relative each other and/or the wheeled supports provides for optimum adjustment to accommodate unevenness in the floor. Also, the provision of means for individually controlling the pivoting of one unit relative another about the "vertical axes" provided by plates 94 and associated structure provide a needed flexibility. For example, the unit behind the miner can be operated through individual control of the jack 84 and motors 78 so as to move in an arc relative its next adjacent unit. Compound movement is provided by driving the bridge in and out with respect to conveyor 10 while the units are pivoting relative each other and relative the conveyor.

While the term "relatively fixed conveyor" is used, it will be understood that I include conveyors which are called "extensible conveyors." These conveyors are adapted to extend in a single direction and thus can, in a sense, follow some of the movements of a mining or other gathering machine. However, it is still essential to have a more flexible connection between this extensible type conveyor and the mining or similar machine since the latter may move in many directions relative the extensible conveyor.

From the above description and the drawings it will be apparent that according to my invention there is provided a cascade conveyor system consisting of independent, self-propelled units connected as a series of trailers. It will also be apparent that one other advantage of my invention is that the units can be individually levelled with respect to the terrain. Further advantages include the fact that the bridge system can be moved and adjusted independently and without being connected to the mining or similar machine.

One additional advantage that should be particularly noticed is that the flexibility provided does not curtail the available bridge length. The total length of each unit can be taken advantage of to obtain maximum "bridging ability."

While I have shown and described a preferred form of my invention, it will be understood by those skilled in the art that many changes can be made and, accordingly, I claim exclusive right to all modifications coming within the scope of the appended claims.

I claim:

1. A bridge conveyor comprising a first and a second unit, each of said units comprising a bulk material conveyor, the first unit being supported adjacent one end by wheels, the second unit being supported adjacent one end by said first unit and adjacent its other end by wheels with the conveyor of said second unit being in material transferring relationship with the conveyor of said first unit, means providing for relative pivotal movement of said units comprising a plate, means supporting said plate on said first unit, means supporting said second unit on said plate, means pivotally connecting one of said units to said plate for pivotal movement relative said plate about a vertical axis, means connecting the other of said units to said plate for pivotal movement relative said plate about a horizontal axis.

2. The bridge conveyor of claim 1 wherein wheels supporting said first unit are connected to said first unit by means providing pivotal movement of said first unit relative said wheels about a horizontal axis extending at an angle with respect to the first mentioned horizontal axis.

3. The bridge conveyor of claim 1 including depending support means connected to said second unit, means movably connecting said support means to said plate for supporting said second unit on said plate and for pivotal movement of said second unit relative said first unit about said vertical axis.

4. The bridge conveyor of claim 1 wherein the wheels adjacent the other end of said second unit are power driven, steerable wheels, means for steering the latter wheels, the latter wheels being adapted to pivotally move the latter unit relative the first said unit about said vertical axis.

References Cited by the Examiner

UNITED STATES PATENTS

| | | | |
|---|---|---|---|
| 1,373,436 | 4/1921 | Lombi | 198—126 |
| 2,525,555 | 10/1950 | Manierre | 198—109 |
| 2,722,409 | 11/1955 | Bergmann | 198—92 |
| 2,805,760 | 9/1957 | Von Stroh | 198—92 |

FOREIGN PATENTS 1,009,995  6/1952  France.

SAMUEL F. COLEMAN, *Primary Examiner.*

ERNEST A. FALLER, *Examiner.*